United States Patent Office 3,020,249
Patented Feb. 6, 1962

3,020,249
PREPARATION OF POLYURETHANE FOAM FROM ALKYD POLYESTER RESIN AND A TOLUENE DIISOCYANATE AND 1,2,6-HEXANETRIOL ADDUCT
Omer E. Curtis, Jr., Toledo, Ohio, assignor to Allied Chemical Corporation, a corporation of New York
No Drawing. Filed July 22, 1957, Ser. No. 673,142
4 Claims. (Cl. 260—2.5)

This invention relates to polyurethane foams and more particularly refers to new and improved methods and compositions in the production of polyurethane foams by reaction of an isocyanate with an alkyd polyester resin.

The production of rigid and semi-rigid polyurethane foam involving the reaction of an arylene diisocyanate and an alkyd polyester resin is known. Unfortunately the resultant products are not entirely satisfactory in that the foam has a relatively high density, has large and coarse cell structure and has relatively poor dimensional stability. Also in practice, it was found difficult to effect efficient mixing of the isocyanate and polyester and to control the foaming rate of the reactants. Although the art suggests forming preliminary reaction products of an isocyanate with certain polyol compounds, such as glycerol, trimethylol propane and triethanolamine, the use of these reaction products for reaction with polyester to produce foams did not overcome the disadvantages inherent in the method and cellular product resulting from the unmodified isocyanate and polyester.

An object of the present invention is to provide a method for producing low density, fine grain, non-shrinking, heat resistant polyurethane foams from an alkyd polyester resin and a modified isocyanate.

Another object of the present invention is to provide a liquid, low viscosity adduct of 1,2,6-hexanetriol and toluene diisocyanate which can be efficiently mixed under controlled foaming rate with an alkyd polyester resin to provide superior polyurethane foams. A further object of the present invention is to provide a method of preparing such adducts of 1,2,6-hexanetriol and toluene diisocyanate. Other objects and advantages of the present invention will be evident from the following description.

In accordance with the present invention, adducts suitable for reaction with an alkyd polyester resin to produce polyurethane foams may be prepared by heating toluene diisocyanate, 2,4-toluene diisocyanate and 2,6-toluene diisocyanate, preferably a mixture of the two diisocyanates containing predominantly 2,4-toluene diisocyanate, to a temperature within the range of 75–125° C., preferably 80–100° C., admixing a small amount of 1,2,6-hexanetriol in the proportion of 4 to 20 parts by weight, preferably 7.5–12.5 parts by weight of 1,2,6-hexanetriol per 100 parts by weight of toluene diisocyanate, regulating the temperature of the mixture of 1,2,6-hexanetriol and toluene diisocyanate below 125° C., preferably within the range of 110–120° C., for a sufficient length of time, usually about 30–60 minutes, to produce an adduct of 1,2,6-hexanetriol and toluene diisocyanate in excess toluene diisocyanate and thereafter cooling to a temperature below 75° C., preferably below 40° C. The resultant product is a liquid, generally pale amber in color, having an amine equivalent within the range of about 110–150, preferably 112–133.

Polyurethane foams of the present invention may be prepared by reacting the adduct of 1,2,6-hexanetriol and toluene diisocyanate in excess toluene diisocyanate with an alkyd polyester resin produced by reaction of a dicarboxylic acid with a polyhydroxy compound in the proportion to provide from about 2 to about 4 isocyanate groups for each hydroxyl group together with water to generate carbon dioxide gas to produce a foam and in the presence of suitable catalysts and dispersing agents.

The adducts of 1,2,6-hexanetriol and toluene diisocyanate may be represented as follows:

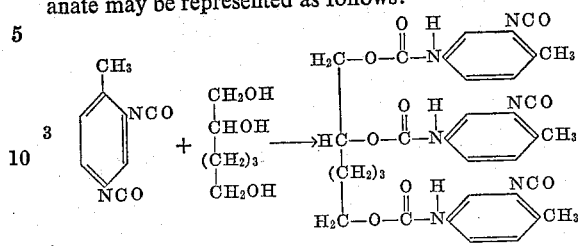

The reaction is shown only between the isocyanate group in the 4-position in 2,4-toluene diisocyanate and 1,2,6-hexanetriol since this position is much more reactive than the 2-position. A small percentage of the groups in the 2-position in either the 2,4- or 2,6-toluene diisocyanate react, and a number of side reactions are possible which may take place to some degree. By thus converting part of the diisocyanate to a triisocyanate, branching and cross-linking in the final urethane foam polymer would be increased and greater rigidity and dimensional stability would result. The reaction product of the polyol and the diisocyanate is called an adduct, but since this reaction product is always prepared, in accordance with the present invention, in excess toluene diisocyanate, the resulting solution in toluene diisocyanate is herein also often referred to as an adduct.

When 100 parts of "Naccoanate" 80, a 80/20 mixture of 2,4- and 2,6-toluene diisocyanates, and 10 parts of 1,2,6-hexanetriol are used in preparing the adduct, there are obtained approximately 48 parts of the adduct dissolved in 62 parts of toluene diisocyanate. This product has 80 percent of the original isocyanate groups available for the foaming reaction.

The adduct solution is more compatible and more readily mixed with polyesters than toluene diisocyanate. Also, when the adduct is reacted with a polyester, a higher molecular weight reaction product is immediately formed than would be the case if "Naccoanate" 80 were used. The formation of this high molecular weight reaction product contributes to a more uniform foaming and especially to the production of small uniform cells since the gas is formed in a more viscous medium. Moreover, the extra cross-linking available in the adduct gives more strength to the cell walls and increases resistance to shrinkage.

The 1,2,6-hexanetriol used in this work was obtained from Carbide and Carbon Chemicals Company and is claimed in U.S.P. 2,768,213, assigned to Shell Development Company (October 23, 1956). This 1,2,6-hexanetriol is not the same as the hexanetriol used in the early German work on polyurethanes. The hexanetriol used in the German work is a by-product of the aldol process and has the structure I given below (cf. "Scientific Researches of I. G. Farbenindustrie in the Field of Synthetic Resin Acids and Drying Oils." Walter Reppe (I. G. Farbenindustrie, Ludwigshaven): Reichsamt Wirtschaftsausbau Pruf-Nr. 36 (PB 52002), 35–46 (1940); CA 41, 4655 (1947)).

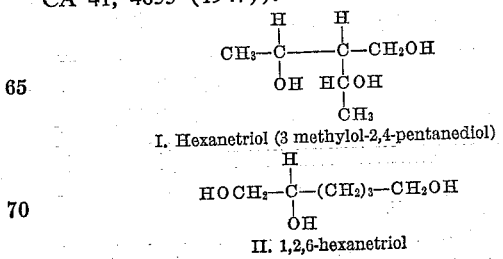

The German "hexanetriol" contains one primary and two secondary hydroxyl groups, while 1,2,6-hexanetriol contains two primary and one secondary hydroxyl group. The reactivity of primary and secondary hydroxyls and their derivatives are widely different and adducts prepared from the German "hexanetriol" and 1,2,6-hexanetriol using toluene diisocyanate give different products and different results. Specifically, the adduct of the German "hexanetriol" (3 methylol-2,4-pentanediol) and toluene diisocyanate in excess toluene diisocyanate is a solid at normal temperature, and this product is not suitable for foaming.

Suitable alkyd polyester resins may be obtained from polycarboxylic acids as phthalic, isophthalic, terephthalic, succinic, adipic, maleic, fumaric, malic, citric, camphoric, diphenic acids or anhydrides thereof; and from such polyhydric alcohols as ethylene glycol, hexamethylene glycol, pinacol, glycerol, trimethylolpropane, hexanetriol, erythritol, pentaerythritol and mannitol.

Polyester resins, which are combined with adduct of toluene diisocyanate-1,2,6-hexanetriol to produce polyurethane foams, comprise the following components in the ranges indicated:

|  | Mols |
|---|---|
| Dibasic acid | 1.00 |
| Diol | 0.00–0.85 |
| Triol | 2.00–0.30 |

Preferred dibasic acids are adipic acid and phthalic anhydride or their mixture. Preferred diols are ethylene glycol and diethylene glycol. Preferred triols are glycerol, trimethylolethane and trimethylolpropane. These components are combined to give polyesters of acid number 0.1–75 (preferably 0.5–25) and hydroxyl numbers of 150–650 (preferably 200–500).

The following are illustrative examples of formulation, preparation and product specifications for three specific polyesters particularly adapted for reaction of the toluene diisocyanate-1,2,6-hexanetriol adduct to produce the polyurethane cellular products.

EXAMPLE 1

*Formulation*

|  | Mols | Weight, percent |
|---|---|---|
| Adipic Acid | 18 | 51.37 |
| Diethylene Glycol | 12.5 | 25.81 |
| Trimethylolethane | 9.7 | 22.81 |

*Preparation*

Charge components. Heat to 160° C. under atmosphere of carbon dioxide, allowing water to distill off. (The carbon dioxide was passed through the reaction at all times.) Increase temperature to 200° C. over a 3-hour period. Hold at 200° C. until an acid number of 20 is reached—approximately 4 hours.

*Product specifications*

Acid No. _____ 15–20.
Hydroxyl No. _____ 225–245.
Viscosity _____ 11,000–18,000 cp. at 25° C.
Color _____ Less than 2.

EXAMPLE 2

*Formulation*

|  | Mols | Weight, percent |
|---|---|---|
| Adipic Acid | 3.0 | 40.5 |
| 1,1,1-trimethylolpropane | 4.8 | 59.5 |

*Preparation*

The components are heated rapidly to 150° C. and then heated slowly to 200° C., allowing water of reaction to distill off. The temperature is held at 200° C. until the acid number of the reaction mixture declines to 20. All heating is done under an inert atmosphere (e.g. carbon dioxide).

*Product specifications*

Acid No. _____ 15–20.
Hydroxyl No. _____ 465–495.
Viscosity _____ About 70,000 cp. (Brookfield) at 25° C.

EXAMPLE 3

*Formulation*

|  | Mols | Weight, percent |
|---|---|---|
| Adipic Acid | 2.5 | 33.38 |
| Phthalic Anhydride | 0.5 | 6.65 |
| 1,1,1-trimethylolpropane | 4.8 | 59.50 |

*Preparation*

The components are heated rapidly to 150° C. and then heated gradually to 250° C., allowing water of reaction to distill off. The temperature is held at 250° C. until the acid number declines to 1.5. All heating is done under an inert atmosphere (e.g. carbon dioxide).

*Product specifications*

Acid No. _____ 1.5 maximum.
Hydroxyl No. _____ 440±5%.
Viscosity _____ D–F (Gardner-Holdt) at 25° C. in a 60% methyl "Cellosolve" acetate solution, or about 300,000–400,000 cp. (Brookfield) at 25° C. at 100% nonvolatile.
Water content _____ 0.15% maximum.

The general procedure for preparing adducts in accordance with the present invention comprises heating a relatively small amount of 1,2,6-hexanetriol with an excess of toluene diisocyanate ("Nacconate" 80) until the exothermic reaction subsides. To avoid possible formation of slight amount of gel, the "Nacconate" 80 should be preheated to a temperature of 75° C., preferably within the range of 80–100° C., and 1,2,6-hexanetriol, preferably also preheated to a temperature above 60° C., preferably within the range of 80–100° C., added to the heated "Nacconate" 80 with constant agitation. External cooling means may be provided to prevent the reaction mixture from exceeding a temperature above 125° C. and to maintain it within the preferred range of 110–120° C. Ordinarily, the reaction will be completed in about 30–60 minutes, after which the mixture is cooled to a temperature below about 40° C.

The following example illustrates the formulation of toluene diisocyanate and 1,2,6-hexanetriol.

EXAMPLE 4

1,2,6-hexanetriol was reacted at 100°–120° C. with the mixture of "Nacconate" 80, 2,4-toluene diisocyanate (80%) and 2,6-toluene diisocyanate (20%) in proportions varying from 4 to 20 parts triol per 100 parts diisocyanate by weight. These proportions correspond to 0.09 to 0.45 equivalents of triol per 100 grams of diisocyanate or 0.052 to 0.26 mols of triol per mol of diisocyanate. The resulting solutions of adducts in excess diisocyanate had equivalent weights (amine equivalents) of from less than 112 to more than 147. These adduct solutions were stable (i.e. they did not gel or precipitate) at room temperature over long periods of time. The most useful adduct solution was that made from 10 parts of 1,2,6-hexanetriol per 100 parts "Nacconate" 80 by weight (0.22 equivalent per 100 grams diisocyanate; 0.13 mol per mol of diisocyanate; amine equivalent 121–123). The latter product is designated "Nacconate" 1080–H.

The equivalent weight of the adducts was determined by titration with dibutyl amine, according to the tentative method of The Society of the Plastics Industry (Proposed Standard Methods, Subcommittee on Raw Materials, Urethane Foam Committee, Cellular Plastics Division).

In the preparation of polyurethane foam, the alkyd polyester may be admixed with water, an activator or catalyst for the polyurethane foaming reaction and preferably a dispersing agent to assist in the mixing of the reactants and the 1,2,6-hexanetriol-toluene diisocyanate adduct. This mixture is then poured into a mold wherein foaming will start immediately. The foam may be cured at room temperature or curing accelerated by the application of heat. The water should be in an amount enough to react with the isocyanate to liberate sufficient gas to produce a foam of the desired physical characteristics. From 0.5 to 10% of water based on the weight of polyester will generally be adequate. The mixing of the constituents to form the polyurethane foam may be carried out at an elevated temperature or at about room temperature.

Suitable catalysts are tertiary amines such as N-alkyl morpholines, trialkylamine, N-dialkyl piperazines and those tertiary amines of sufficiently basic character that contain hydroxy groups, of which type the following may be mentioned, dimethylethanolamine, methyldiethanolamine and triethanolamine. The amount of catalyst will usually range from 0.5 to 5% by weight of the polyester.

The preferred emulsifiers are of the non-ionic type, such as a monoether of a polyethylene glycol with an alkyl phenol, blends of poly alcohol carboxylic acid esters and oil soluble sulfonates ("Witco 77-86"), polyoxyethylated castor oil ("Emulphor EL-719"), sorbitan monolaurate ("Span 20"), and poly oxy alkylene derivatives of sorbitan monolaurate (e.g. "Tween 20" and "Tween 80"). Anionic emulsifiers such as sodium dioctyl sulfosuccinate ("Aerosol" OT) may also be used. The amount of emulsifier usually is within the range of 0.5 to 5% by weight of the polyester.

The following example illustrates the preparation of adduct from 1,2,6-hexanetriol and toluene diisocyanate.

EXAMPLE 5

In a 12 liter 4-necked flask containing a thermometer, drying tube, heated addition funnel, and stirrer, was placed 11,000 g. of "Nacconate" 80. The "Nacconate" 80 was heated to 100° C. and the heating mantle removed. Then 1,100 g. of 1,2,6-hexanetriol at 80° C. was added slowly, causing an exothermic reaction. The reaction temperature was kept between 115 and 120° C. by cooling the flask with an air stream. The addition took 45 to 60 minutes, and after the last addition the reaction-mixture was allowed to cool with stirring to 80° C. and poured. The finished product was a light yellow liquid with a Gardner-Holdt viscosity of G to H and an amine equivalent of 122.

The following examples illustrate preparation of foam from 1,2,6-hexanetriol adducts.

EXAMPLE 6

The use of the adduct of Example 5 with the polyester in Example 1 will give tough, non-friable, dimensionally stable, unicellular, semi-rigid urethane foams over a density range from 1–15 pounds per cu. ft.

In the following formulations the polyester is premixed with the water, emulsifier and catalyst and then mixed with the adduct of Example 5 and poured. The foams have a slow even rise making them suitable for filling voids of many shapes. All foams can be cured at room temperature and will stand 110° C. for brief periods of time without shrinkage. The buoyancy of the cut foam (molded skins removed) is reduced by only about 5% after complete immersion in water at room temperature for two weeks.

| Formulation | A[1] | B | C | D | E |
|---|---|---|---|---|---|
| | (parts by weight) | | | | |
| Polyester Example 1 | 100 | 100 | 100 | 100 | 100 |
| Adduct Example 5 | 215 | 180 | 150 | 120 | 60 |
| Water | 10 | 4 | 2 | 1 | |
| "Witco" 77-86 | 1 | | | | 1 |
| "Emulphor" EL-719 | | 1 | 1 | 1 | 0.1 |
| N-Methylmorpholine | 1 | 1 | 1 | 1 | |
| Approximate Density, lb./cu. ft. | 1.3 | 2.0 | 3.0 | 4.0 | 15.0 |

[1] The foam from Formulation A after curing at room temperature for 3 to 5 days can be cut and kept at 110° C. for 24 hours without shrinkage.

EXAMPLE 7

The use of the adduct of Example 5 with the polyester in Example 2 will give tough, non-friable, dimensionally stable, unicellular, rigid urethane foams over a density range from 1 to 22 pounds per cu. ft.

In the following formulations the polyester is premixed with the water, emulsifier and catalyst and then mixed with the adduct of Example 5 and poured. The foams have a slow even rise, making them suitable for filling voids of many shapes. All foams can be cured at 110° C. while the foams from Formulations C, D, E and F may also be cured at room temperature. The foams will all stand 110° C. for 24 hours without shrinkage. The buoyancy of the cut foam (molded skins removed) for Formulations B through F is reduced by only about 5% after complete immersion in water at room temperature for one week.

| Formulation | A | B | C | D | E | F |
|---|---|---|---|---|---|---|
| | (parts by weight) | | | | | |
| Polyester Example 2 | 100 | 100 | 100 | 100 | 100 | 100 |
| Adduct Example 5 | 275 | 195 | 170 | 140 | 120 | 110 |
| Water | 10 | 6 | 4 | 2 | 0.5 | |
| "Witco" 77-86 | 1 | 1 | 1 | 1 | 1 | 1 |
| N-Methylmorpholine | 1 | 1 | 1 | 1 | | |
| Approximate density, lb./cu. ft. | 1.3 | 1.7 | 2.0 | 3.3 | 9.5 | 22 |
| Approximate compressive strength, p.s.i. | 12 | 20 | 26 | 62 | 300 | 1,400 |

Although certain preferred embodiments of the invention have been disclosed for purpose of illustration, it will be evident that various changes and modifications may be made therein without departing from the scope and spirit of the invention.

I claim:
1. A process for the production of polyurethane foam which comprises reacting the adduct of 1,2,6-hexanetriol and toluene diisocyanate in excess toluene diisocyanate prepared by heating toluene diisocyanate to a temperature within the range of 75–125° C., admixing 1,2,6-hexanetriol in the proportion of 4–20 parts by weight of 1,2,6-hexanetriol per 100 parts by weight of toluene diisocyanate, maintaining the temperature of the mixture consisting essentially of 1,2,6-hexanetriol and toluene diisocyanate within the range of 100–125° C. for a sufficient length of time to produce an adduct of 1,2,6-hexanetriol and toluene diisocyanate in excess toluene diisocyanate; with an alkyd polyester resin produced by reaction of a dicarboxylic acid selected from the group consisting of phthalic, isophthalic, terephthalic, succinic, adipic, maleic, fumaric, malic, camphoric, diphenic acids and anhydrides thereof, with a polyhydroxy compound selected from the group consisting of ethylene glycol, diethylene glycol, hexamethylene glycol, pinacol, glycerol, trimethylolpropane, trimethylolethane, hexanetriol, erythritol, pentaerythritol, and mannitol in the proportion of 1.00 mol dibasic acid, less than 0.85 mol diol polyhydroxy compound and 2.00–0.35 mol triol polyhydroxy compound together with water to produce a foam and in the presence of a tertiary amine resinification catalyst and an organic dispersing agent.

2. A process for the production of polyurethane foam which comprises reacting the adduct of 1,2,6-hexanetriol and toluene diisocyanate in excess toluene diisocyanate prepared by heating a 80/20 mixture of 2,4-toluene diisocyanate and 2,6-toluene diisocyanate to a temperature within the range of 80–100° C., admixing 1,2,6-hexanetriol in the proportion of about 10 parts by weight of 1,2,6-hexanetriol per 100 parts by weight of toluene diisocyanate maintaining the temperature of the mixture consisting essentially of 1,2,6-hexanetriol and toluene diisocyanate within the range of 110–120° C. for a sufficient length of time to produce an adduct of 1,2,6-hexanetriol and toluene diisocyanate in excess toluene diisocyanate, with an alkyd polyester resin produced by reaction of adipic acid with diethylene glycol and trimethylolethane in the proportion of 18 mols adipic acid, 12.5 mols diethylene glycol and 9.5 mols trimethylolethane, together with water to produce a foam and in the presence of a tertiary amine resinification catalyst and an organic dispersing agent.

3. A process for the production of polyurethane foam which comprises reacting the adduct of 1,2,6-hexanetriol and toluene diisocyanate in excess toluene diisocyanate prepared by heating a 80/20 mixture of 2,4-toluene diisocyanate and 2,6-toluene diisocyanate to a temperature within the range of 80–100° C., admixing 1,2,6-hexanetriol in the proportion of about 10 parts by weight of 1,2,6-hexanetriol per 100 parts by weight of toluene diisocyanate, maintaining the temperature of the mixture consisting essentially of 1,2,6-hexanetriol and toluene diisocyanate within the range of 110–120° C. for a sufficient length of time to produce an adduct of 1,2,6-hexanetriol and toluene diisocyanate in excess toluene diisocyanate, with an alkyd polyester resin produced by reaction of adipic acid with 1,1,1-trimethylolpropane in the proportion of 3.0 mols adipic acid and 4.8 mols 1,1,1-trimethylolpropane, together with water to produce a foam and in the presence of a tertiary amine resinification catalyst and an organic dispersing agent.

4. A process for the production of polyurethane foam which comprises reacting the adduct of 1,2,6-hexanetriol and toluene diisocyanate in excess toluene diisocyanate prepared by heating a 80/20 mixture of 2,4-toluene diisocyanate and 2,6-toluene diisocyanate to a temperature within the range of 80–100° C., admixing 1,2,6-hexanetriol in the proportion of about 10 parts by weight of 1,2,6-hexanetriol per 100 parts by weight of toluene diisocyanate, maintaining the temperature of the mixture consisting essentially of 1,2,6-hexanetriol and toluene diisocyanate within the range of 110–120° C. for a sufficient length of time to produce an adduct of 1,2,6-hexanetriol and toluene diisocyanate in excess toluene diisocyanate, with an alkyd polyester resin produced by reaction of adipic acid, phthalic anhydride and 1,1,1-trimethylolpropane in the proportion of 2.5 mols adipic acid, 0.5 mol phthalic anhydride and 4.8 mols 1,1,1-trimethylolpropane, together with water to produce a foam in the presence of a tertiary amine resinification catalyst and an organic dispersing agent.

References Cited in the file of this patent

UNITED STATES PATENTS

| | | |
|---|---|---|
| 2,602,783 | Simon et al. | July 8, 1952 |
| 2,768,213 | Whetstone et al. | Oct. 23, 1956 |
| 2,864,780 | Katz et al. | Dec. 16, 1958 |
| 2,910,381 | Vogel | Oct. 27, 1959 |

FOREIGN PATENTS

| | | |
|---|---|---|
| 870,400 | Germany | Mar. 12, 1953 |

OTHER REFERENCES

Richter: "Organic Chemistry," volume 1, Aliphatic Series, page 528, received in U.S. Patent Office, October 31, 1925.

Heibron: "Dictionary of Organic Compounds," volume 2, page 676, copyright 1953.